(12) United States Patent
Chouldjian et al.

(10) Patent No.: US 7,013,007 B1
(45) Date of Patent: Mar. 14, 2006

(54) COMPUTER TELEPHONY POWER SUPPLY METHOD AND APPARATUS

(75) Inventors: Simon Chouldjian, San Francisco, CA (US); Joseph Chiu, Fremont, CA (US); Leo Liu, Palo Alto, CA (US)

(73) Assignee: AltiGen Communications, Inc., Fremont, CA (US)

( * ) Notice: Subject to any disclaimer, the term of this patent is extended or adjusted under 35 U.S.C. 154(b) by 0 days.

(21) Appl. No.: 09/228,710

(22) Filed: Jan. 11, 1999

(51) Int. Cl.
H04M 9/00 (2006.01)

(52) U.S. Cl. .................. 379/413; 379/395.01; 379/156

(58) Field of Classification Search .............. 379/413, 379/242, 225, 376, 249, 93.05, 201.03, 67, 379/413.01, 418, 156, 164, 372, 229–241, 379/399.01, 322–324, 307, 186–187, 167.01, 379/169, 176–177, 165–166, 395.01; 370/466; 713/300
See application file for complete search history.

(56) References Cited

U.S. PATENT DOCUMENTS

| | | | | |
|---|---|---|---|---|
| 3,940,572 | A * | 2/1976 | Burgess | 379/156 |
| 3,978,293 | A * | 8/1976 | Feiner | 379/252 |
| 4,406,004 | A * | 9/1983 | Hall et al. | 379/249 |
| 4,539,437 | A * | 9/1985 | Giacopelli et al. | 379/384 |
| 4,578,542 | A * | 3/1986 | Alderman | 379/376.01 |
| 4,726,060 | A * | 2/1988 | Itoh et al. | 379/373.01 |
| 5,649,005 | A * | 7/1997 | Lynch et al. | 379/242 |
| 5,875,234 | A * | 2/1999 | Clayton et al. | 379/93.05 |
| 5,884,086 | A * | 3/1999 | Amoni et al. | 713/300 |
| 6,118,862 | A * | 9/2000 | Dorfman et al. | 379/201.03 |
| 6,154,465 | A * | 11/2000 | Pickett | 370/466 |

* cited by examiner

*Primary Examiner*—Sinh Tran
*Assistant Examiner*—Walter F Briney, III
(74) *Attorney, Agent, or Firm*—Townsend and Townsend and Crew LLP (57) ABSTRACT

A method for generating power signals within a telephone server coupled to a computer system via an interface bus or in-house power connector, to a maximum number of telephones, and to a telephone trunk, the computer system providing a primary voltage signal and a secondary voltage signal, includes receiving the primary voltage signal and the secondary voltage signal from the computer system, generating a ringer power signal in response to the primary voltage, generating a direct inward dialing power signal in response to the primary voltage, the direct inward dialing power signal configured to provide a first operational power signal for telephones from the maximum number of telephones receiving telephone calls directly from the telephone trunk, generating a second operational power signal in response to the primary voltage for telephones from the maximum number of telephones receiving telephone calls from other telephones from the maximum number of telephones, and generating a ringing signal in response to the ringer power signal and to the secondary voltage signal, wherein the ringer power signal powers ringers of no more than approximately one half of the maximum number of telephones at a time.

19 Claims, 8 Drawing Sheets

COMPUTER TELEPHONY POWER SUPPLY METHOD AND APPARATUS

BACKGROUND OF THE INVENTION

The present invention relates to computer telephony. More specifically, the present invention relates to a telecommunications interface for a computer that provides electrical power appropriate for telephony applications.

Present day analog telephone systems the United States typically rely upon standards set by Bellcore, the standards division of the former Bell Telephone Company. These exhaustive standards detail the magnitudes of a variety of telephone related signals, the periods of signals, the timings of signals, and the like. For example, these Bellcore standards specify a range of voltages necessary to power an analog telephone, a range for voltages necessary to ring a ringer of a telephone, methods for indicating when messages are waiting in a voice mail-type system, and the like. Many other such standards are also described, including the duration of a telephone ring, and the like.

In the past, typical private branch exchange (PBX) systems for large and small corporations included computer systems having proprietary switching hardware and proprietary control software. These traditional PBX systems were very costly in terms of hardware and software required, as well as very costly in terms of maintenance and service required. For example, traditional PBX systems typically range in cost of tens of thousands of dollars for a simple PBX system to hundreds of thousands of dollars for a large PBX and on up. Such PBX systems were thus very costly, especially for smaller to medium sized businesses.

Only recently has the personal computer become a viable hosting mechanism for telephony applications. This was due in part to the increased processing power of personal computers and the availability of more robust real-time multi-processing, multi-threaded operating systems. Other reasons for the paradigm shift to computer telephony was the introduction of dedicated computer plug-in boards and software that provided PBX switching functionality.

By providing relatively low cost hardware and open and maintainable software, in contrast to the traditional systems, the new computer telephony integration (CTI) model has drastically reduced the costs of PBXs systems. One of the pioneering companies in the field of computer telephony integration was AltiGen Communications AltiServ™ product.

One of the many challenges of combining telephony applications with personal computers was that typical computers generated a small number of output voltages for plug-in boards. For example, voltages on ISA, EISA, VESA, PCI, and the like buses typically include only +12 volts DC and +5 volts DC. In contrast, telephony applications, as specified by Bellcore standards, typically require telephone output signals such as −24 volts DC, −48 volts DC, −125 volts DC, 90 volts AC, and the like. Thus, for computer telephone integration to be successful, voltages appropriate for telephony had to be supplied to the plug-in boards.

One method for providing plug-in telephone server boards with power supply voltages appropriate for telephony has been to provide external power supplies to the plug-in boards. In such cases, the user would plug-in the telephone server into a computer chassis, plug in an external power supply into a wall socket, and then couple the external power supply to the telephone server in the computer. In such a case, the telephone server would rely upon power from the external power supply to provide operational power to the telephones, to provide ringing signals, and the like.

Drawbacks to such methods included that the user could be required to provide dedicated external power supplies for each plug-in board. Other drawbacks included that the external power supplies were typically off the shelf and provided more power capability than was needed. Further, in the case where the user wanted uninterrupted phone service, such methods required the user to get separate uninterrupted power supplies for the computer and for the external power supply.

Thus, in light of the above, what is needed in the industry are improved methods and apparatus for providing power necessary for computer telephony applications.

SUMMARY OF THE INVENTION

The present invention discloses methods and apparatus for providing power appropriate for telephony using power supplied from a host computer. Further understanding of the nature and advantages of the invention may be realized by reference to the remaining portions of the specification and drawings.

According to an embodiment of the present invention, a method for generating power signals within a telephone server coupled to a computer system via an interface bus, to a maximum number of telephones, and to a telephone trunk, the computer system providing a primary voltage signal and a secondary voltage signal, includes receiving the primary voltage signal and the secondary voltage signal from the computer system, and generating a ringer power signal in response to/the primary voltage. The method also includes generating a direct inward dialing power signal in response to the primary voltage, the direct inward dialing power signal configured to provide a first operational power signal for telephones from the maximum number of telephones receiving telephone calls directly from the telephone trunk, generating a second operational power signal in response to the primary voltage for telephones from the maximum number of telephones receiving telephone calls from other telephones from the maximum number of telephones, and generating a ringing signal in response to the ringer power signal and to the secondary voltage signal. The ringer power signal is configured to power ringers of no more than approximately one half of the maximum number of telephones at a time.

According to another embodiment, a telephone server coupled to a computer system via a computer bus, configured to generate output power signals to a plurality of telephones, and to a telephone trunk, the computer system providing a primary voltage signal and a secondary voltage signal, includes a transformer circuit configured to receive the primary voltage signal and to generate a first operational power signal in response to the primary voltage signal, to generate a second operational power signal in response to the primary voltage signal, and to generate a ringer power signal in response to the primary voltage signal, the first operational power signal for providing power to telephones receiving telephone calls from the telephone trunk, the second operational power signal for providing power to telephones receiving telephone calls from other telephones of the plurality of telephones. The telephone server also includes a ringer circuitry coupled to the transformer circuit configured to receive the ringer power signal, to receive the second voltage signal, and to generate a ringing signal in response thereto. The transformer circuit is configured to generate sufficient power for the ringer power signal to supply no more than approximately one half the maximum number of telephones coupleable to the telephone server at a time.

According to yet another embodiment of the present invention a method for a telecommunications interface for providing drive voltages for a plurality of telephones coupled thereto, the telecommunications interface also coupled to a computer system, the computer system providing a first drive voltage and a second drive voltage to the telecommunications interface, includes receiving an enabling signal for the telecommunications interface from the computer system, and generating a ringing drive voltage with the telecommunications interface in response to the first drive voltage and to the enabling signal. The method also includes generating a first operational drive voltage for a telephone from the plurality of telephones when a directly dialed call from the telephone trunk is for the telephone, and generating a second operational drive voltage for the telephone when an internally dialed call from another telephone of the plurality of telephones is for the telephone. The method also provides generating a ring signal for the telephone in response to the ringing drive voltage, and to the second operational drive voltage when the internally dialed call is for the telephone.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

System Overview

Figure 1:
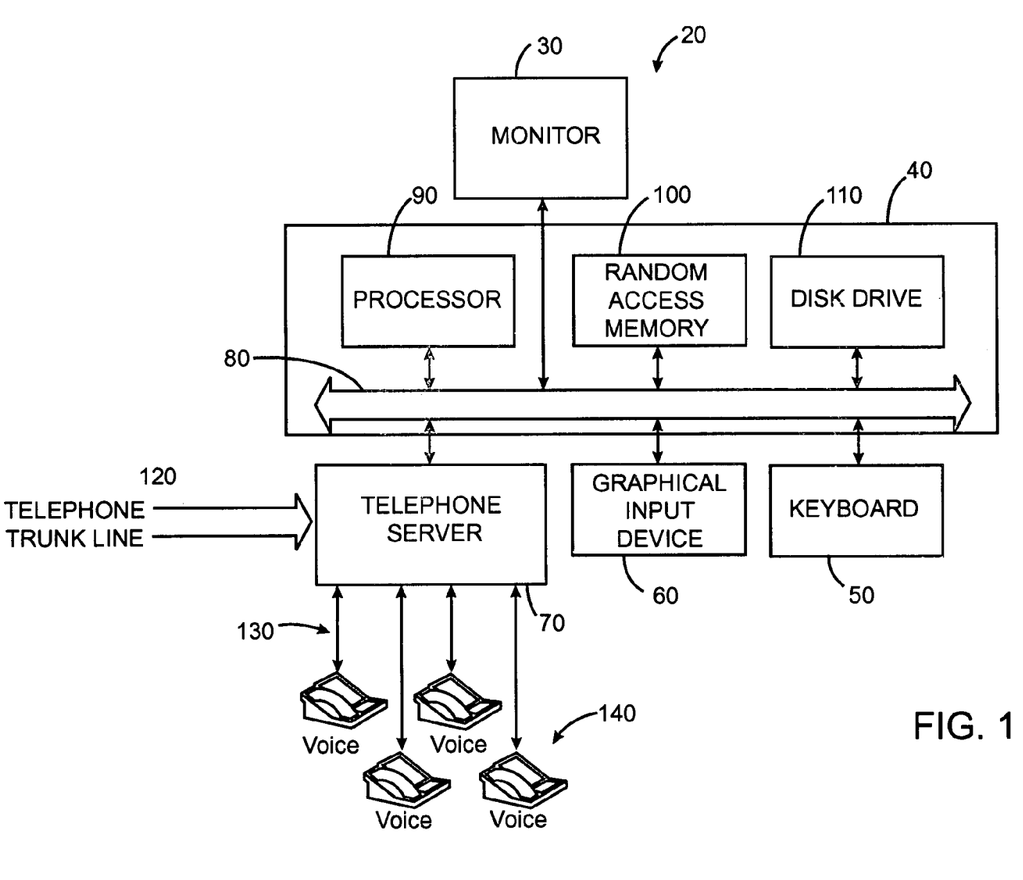
FIG. 1 is a block diagram of a computer telephony system according to a preferred embodiment of the present invention.

FIG. 1 is a block diagram of a computer telephony system 20 according to a preferred embodiment of the present invention. Computer telephony system 20 includes a monitor 30, a computer 40, a keyboard 50, a graphical input device 60, and a telephone server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telephone server 70. Handsets 140 may be coupled to individual telephone lines 130.

Handsets 140 are preferably analog signal telephone handsets, however alternatively they may be any well known type of digital or analog telephone handset. A mouse is but one example of an input device 370, also known as a pointing device. Other types of input devices may include trackballs, drawing tablets, microphones (for voice activated input), and the like. Computer telephony system 20 may be coupled to a computer network through use of a network interface, not shown, such as an Ethernet card, a modem, and the like.

RAM 100 and disk drive 110 are examples of tangible media for storage of data, message files, computer programs, drivers for the telephone server, embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, computer telephony system 20 includes an IBM PC compatible computer having a '586-class based microprocessor, such a Pentium™ microprocessor from Intel Corporation. Further, in the present embodiment, computer telephony system 20 operates utilizing the WindowsNT™ operating from Microsoft Corporation, to run AltiWareOE™ software from AltiGen Communications, Inc. Telephone server 70 is preferably embodied as a Quantum™ PCI based plug-in expansion board from AltiGen Communications, Inc.

FIG. 1 is representative of but one type of system for embodying the present invention. It will be readily apparent to one of ordinary skill in the art that many system types of hardware and software configurations are suitable for use in conjunction with the present invention. For example, any computer communications bus may be used with alternative embodiments of the present invention, further computer telephony system 20 may operate under the LINUX operating system, may be ported onto a PowerPC G3 class microprocessor computer running MAC OS 8.5 from Apple Computer Corporation, and the like.

Hardware Description

Figure 2:
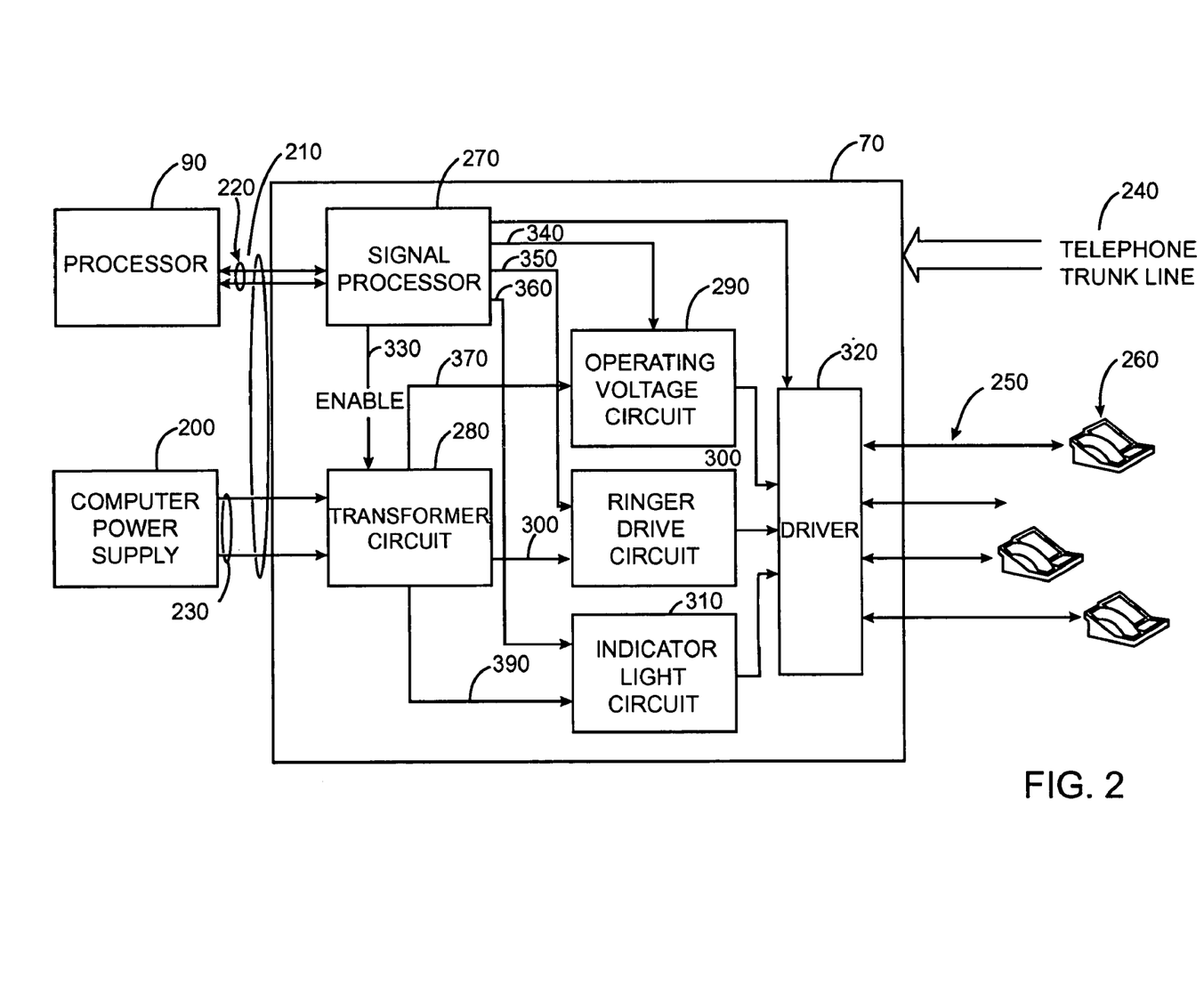
FIG. 2 is a more detailed block diagram of a portion of a computer telephony system according to an embodiment of the present invention.

FIG. 2 is a more detailed block diagram of a portion of a computer telephony system according to an embodiment of the present invention.

FIG. 2 illustrates processor 90 from FIG. 1, a computer power supply 200, and a more detailed view of telephone server 70 from FIG. 1. As illustrated, processor 90 and computer power supply 200 are coupled to telephone server 70 via computer bus 210. Computer bus 210 includes a plurality of data lines 220, and power lines 230.

In the present embodiment, the computer telephony system interfaces with telephone trunk lines 240 and with internal telephone lines (or internal telephone extension lines) 250. In turn, telephone lines 250 are coupled to telephone handsets 260.

In the present embodiment, a maximum of twelve telephone lines 250 are provided for each telephone server 70. In alternative embodiments, support for a greater or fewer number of telephone lines can be provided for each telephone server 70. Of course, each telephone extension line 250 may or may not have a telephone handset 260 coupled thereto.

As illustrated in FIG. 2, telephone server 70 includes a signal processor 270, a transformer circuit 280, an operating voltage circuit 290, a ringer drive circuit 300, an indicator light circuit 310, and a telephone driver circuit 320. FIG. 2 illustrates that signal processor is coupled to transformer circuit 280 via signal line 330, to operating voltage circuit 290 via signal line 340, to ringer drive circuit 300 via signal line 350, and to indicator light circuit via signal line 360. Transformer circuit 280 is coupled to operating voltage circuit 290 via power line 370, to ringer drive circuit 300 via power line 380, and to indicator light circuit 310 via power line 390.

In FIG. 2, signal processor 270 is used to control the operation of telephone server 70 according to instructions from the AltiWare™ software previously described. In one embodiment of the present invention, AltiWare™ software, operates in a multi-threaded multi-tasking environment, where each thread monitors the status of a particular telephone extension line 250. The status of the particular telephone extension line is typically represented as a state machine in the software.

Signal processor 270 is embodied as a Texas Instruments TMS320C5X digital signal processor (DSP), and is coupled to receive instructions, and the like from processor 90 via signal lines 220. Of course other DSPs may be used in other embodiments of the present invention.

In the present embodiment, signal processor 270 controls power supplied to each telephone extension line. For example, in this embodiment, signal processor 270 is used to enable power to be supplied to the functional circuits described above, to control the distribution of power for different telephony applications to each telephone handset 260, and the like.

Signal processor 270 typically comprises a multi-process environment wherein each process monitors and can modify the status of a particular telephone extension line 250. The status of the particular telephone extension line is represented as a state machine within the signal processor 270. In one embodiment of the present invention, signal processor 270 is able to process up to a maximum of twelve telephone lines being simultaneously in off-hook conditions. In alternative embodiments, monitoring of a greater or fewer number of telephone lines 230 is contemplated, solely depending upon the configuration required.

In FIG. 2, transformer circuit 280 is illustrated receiving power from power lines 230 from computer bus 210. In the present embodiment, the power output from transformer circuit 280, on power line 370, on power line 380, and on power line 390 are controlled by an enabling (or disabling) signal on signal line 330. The enabling signal is preferably generated in response to signals from the AltiWare™ software, previously mentioned, installed on computer 40.

In alternative embodiments of the present invention, the enabling signal may be used to switch on or switch off power provided to other circuits in telephone server 70. In other embodiments, multiple enabling signals on multiple signal lines, or coded onto signal line 330 may be used. In such embodiments, more detailed control over power distribution to different telephone lines 250 would be provided. For example, in one embodiment, application of power and signals to specific telephone lines 250 (or telephone handsets 260), or groups of telephone lines 250 can be enabled or disabled according to instructions from signal processor 270 and/or the AltiWare™ software.

As illustrated in FIG. 2, transformer circuit 280 provides power to operating voltage circuit 290 via power line (lines) 370. In turn, operating voltage circuit 290 provides the basic operational power for telephone handsets 260 on telephone lines 250. In the present embodiment, two different power voltage levels are provided on power line 370, a first operational voltage of approximately −48 volts to approximately −50 volts DC and a second operational voltage of approximately −24 volts to approximately −25 volts DC. The operational voltage provided to telephone handsets 260 is typically determined by signal processor 270 via signal line 340. The voltages are negative DC merely for convention purposes.

In other embodiments of the present invention, the operational voltages may vary in accordance with Bellcore tolerances for operational voltages. In this embodiment, the second operational voltage is approximately half the first operational voltage, although this relationship may be freely changed in other embodiments.

In the present embodiment, two operational voltages are provided to reduce output power requirements on transformer circuit 280. The first operational voltage in this embodiment, approximately −48 volts DC is typically provided to a telephone handset 260 when signal processor 270 connects a telephone call from telephone trunk line 240 to the telephone handset 260. This typically occurs when there is a direct inward dialed (DID) telephone call. For example, an outside party directly dialing a user's private number at a company. This first operational voltage is provided to the telephone handset 260 typically to conform with the Bellcore standards.

A second operational voltage in this embodiment, approximately −24 volts DC is typically provided to a telephone handset 260 when signal processor 270 connects a telephone call from another internal telephone line, or when a call from an outside party is switched from an attendant or auto attendant. In these cases the phone calls are considered "internal." Because internal telephone networks are typically limited in coverage area, for example, within a building, the operational voltage for telephone handsets 260 for these internal calls may be reduced.

In the present embodiment, by reducing the operational voltage for "internal" calls the power required by operating voltage circuit 290 from transformer circuit 280 is also reduced. In this embodiment, telephone server 70 can be configured in the factory to limit the number of DID telephone calls that can be occur at the same time. Thus the amount of power required by operating voltage circuit 290 can be reduced by limiting the number of DID telephone calls to less than the number of telephone lines 250. In this embodiment, the typical amount of current provided by transformer circuit 280 at −48 volts DC is approximately 150 milliamps, and the amount of current provided at −24 volts DC is approximately 300 milliamps.

In alternative embodiments, other operational voltages may also be used based upon the characteristics of the call. Further, the operational voltages may be changed depending upon the coverage area, and the current ratings can be changed.

In FIG. 2, ringer drive circuit 300 is coupled to transformer circuit 280 via power line(s) 380. In the present embodiment transformer circuit 280 provides ringer power on power line 380. In one embodiment, the voltage of the ringer power is approximately −200 volts AC. The voltage is negative AC merely for convention purposes. The amplitude may be different, for example, greater or lesser, in alternative embodiments of the present invention. In the present embodiment, ringer drive circuit 300 also receives secondary power directly from power lines 230. The voltage of the secondary power is typically on the order of 5 volts, although other voltages may also be advantageously used.

In the present embodiment, in response to an incoming telephone call, signal processor 270 sends a ring enable signal to ringer drive circuit 300 for a particular telephone extension line 250. In response, ringer drive circuit 300 generates a ringing signal for the particular telephone extension line 250. In the present embodiment, the ringing signal is on the order of −90 volts AC.

As will be described later in more detail, in order to reduce the amount of power drawn by ringer drive circuit 300, signal processor 270 limits the number of telephone handsets that can "ring" simultaneously one time to less than the maximum number of telephones handsets 260 that can be attached to telephone server 70. In one embodiment where the maximum number of telephone lines 250 is twelve, the number of telephones that can "ring" at one time is one half, or six. In another embodiment, the number of telephones that can "ring" at one time is one third, or four.

In the present embodiment, the maximum amount of current drawn by ringer drive circuit 300 at −200 volts AC is on the order of approximately 50 milliamps. In other embodiments, the amount of current can be different.

In FIG. 2, indicator light circuit 310 is coupled to transformer circuit 280 via power line(s) 390. In the present embodiment transformer circuit 280 provides indicator light power on power line 390. In one embodiment, the voltage of the indicator light power is approximately −125 volts DC. The voltage is negative DC merely for convention purposes. The amplitude may be different, for example, greater or lesser, in alternative embodiments of the present invention.

In the present embodiment, the indicator light is used typically to indicate to a user that the user has a voice mail message waiting in a mailbox, or the like. When a message is waiting, signal processor 270 generates a signal to indicator light circuit 310 to generate an indicator light signal to the appropriate telephone handset 260. The present embodiment incorporates a "voltage message waiting" technique, as specified by Bellcore standards, to indicate a message is waiting.

In alternative embodiments of the present invention, other types of message waiting may be utilized, for example a stuttered dial tone, a frequency shift key (FSK) technique and the like. In such embodiments, power consumption is typically not as great a concern as it is in the present embodiment.

As will be described later in more detail, in order to reduce the amount of power drawn by indicator light circuit 310, signal processor 270 limits the number of indicator lights that can flash simultaneously to less than the maximum number of telephones handsets 260 that can be attached to telephone server 70. In one embodiment where the maximum number of telephone lines 250 is eighteen, the number of indicator lights that can flash at one time is half, or nine indicator lights. In another embodiment, the number of indicator lights that can flash at one time is one third of eighteen telephones, or six indicator lights.

In the present embodiment, the maximum amount of current drawn by indicator light circuit 310 at −125 volts DC is on the order of approximately 85 milliamps. In this embodiment, there are sixteen telephones, and only two indicator light cycles, thus only eight indicator lights are active at the same time. Because each indicator light draws on the order of approximately 10 milliamps, the total current draw at any time is approximately 85 milliamps. In other embodiments, different current draws are contemplated based upon specific configurations.

Driver 320 is provided to receive the power or signals from operating voltage circuit 290, ringer drive circuit 300, indicator light circuit 310, or the like and to output the power or signals to the appropriate telephone handsets 260 attached to telephone lines 250. Typically driver 320 provides output from only one of the above coupled circuits to a telephone extension at any one time.

In an alternative embodiment of the present invention driver 320 may be coupled to signal processor 270. In such an embodiment, signal processor 270 can control the output of driver 320 with regards to each telephone extension line 250. As a result, signal processor 270 can selectively enable and disable output power or signals to individual telephone lines.

Figure 3A:
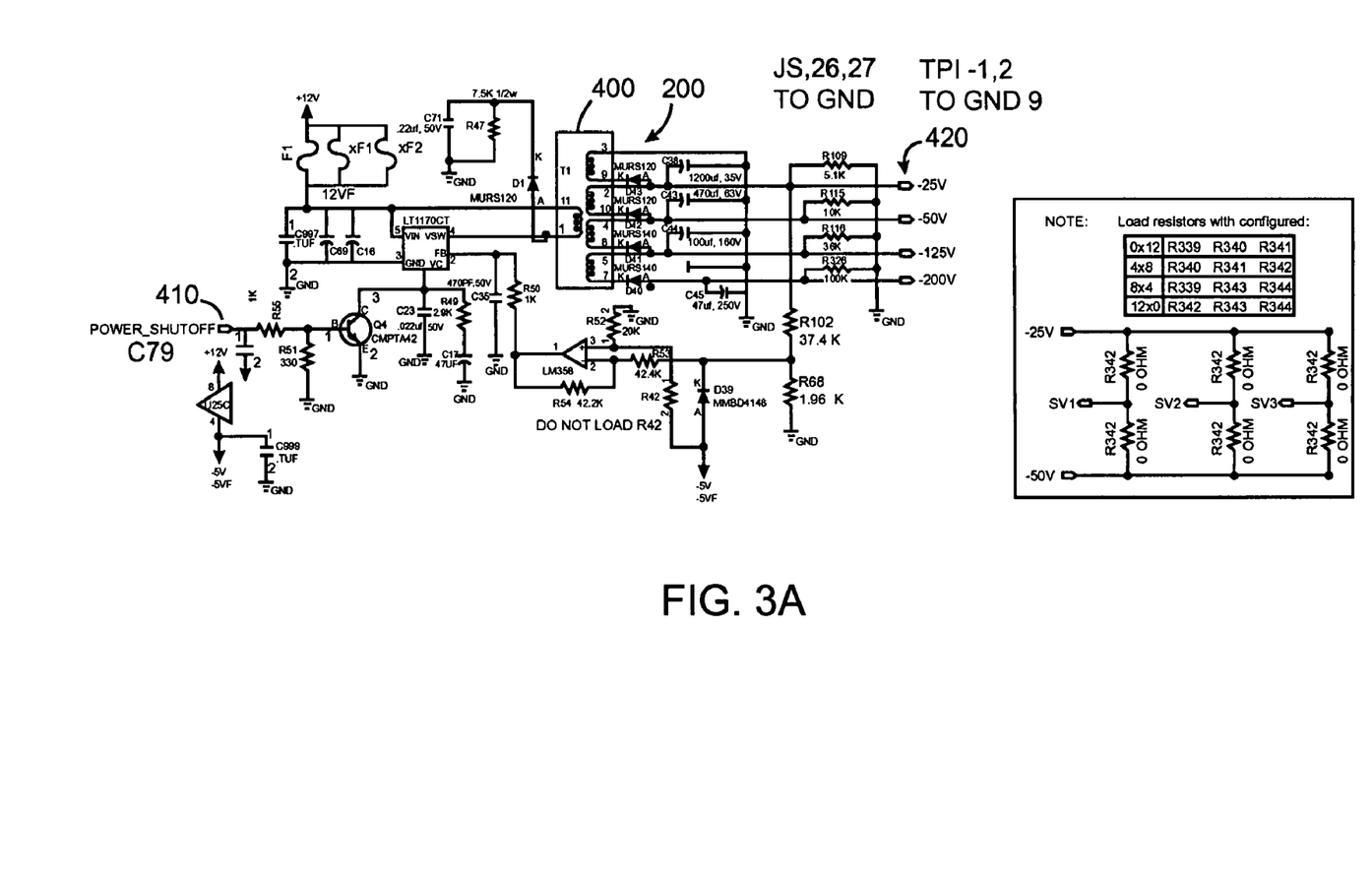
FIG. 3 illustrates a portion of a more detailed embodiment of the present invention.
Figure 3B:
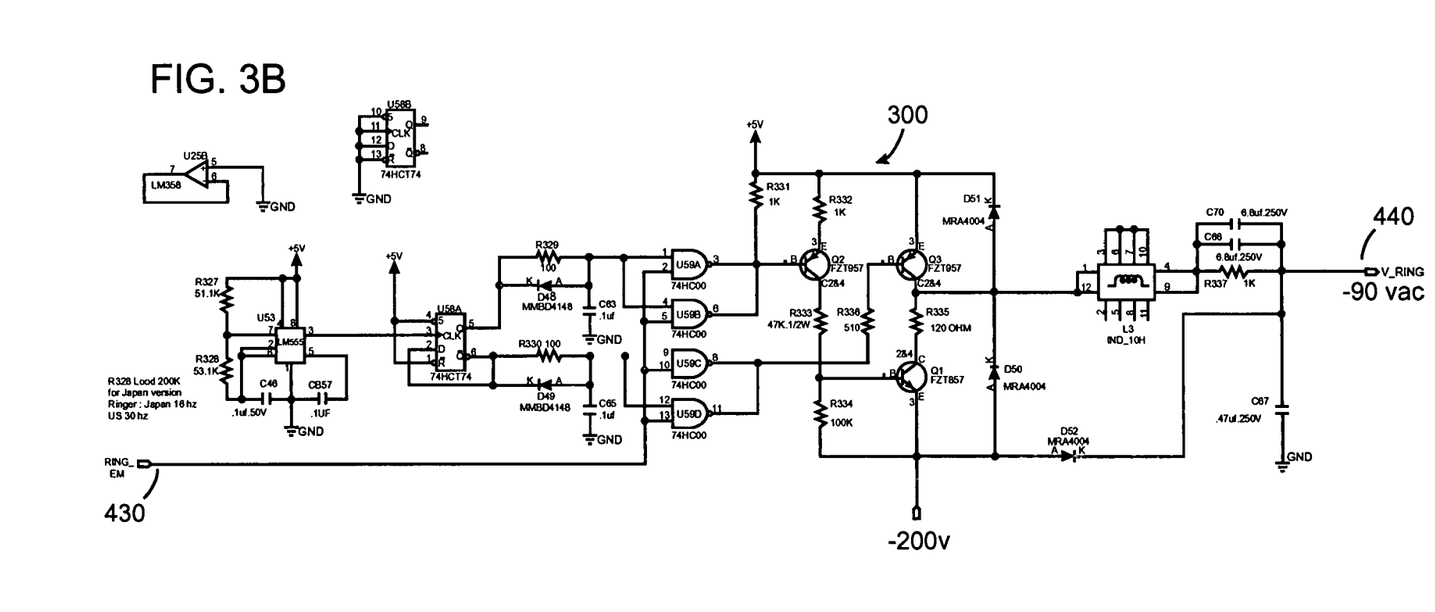
Figure 3C:
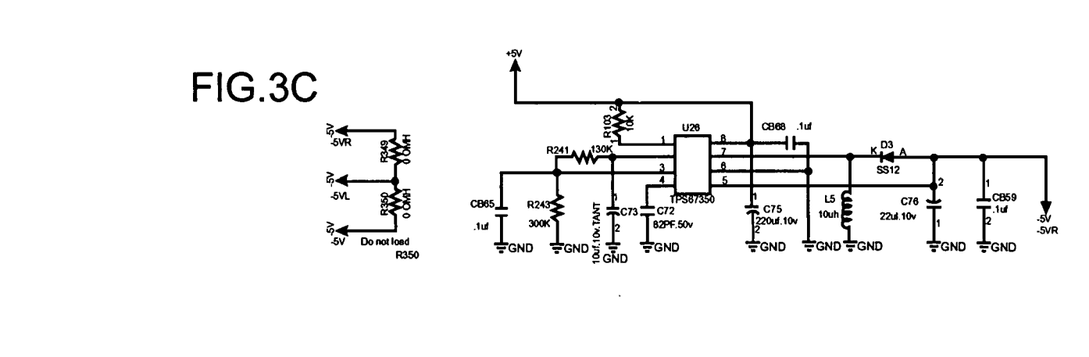

FIG. 3 illustrates a more detailed embodiment of a portion of the present invention. FIG. 3 includes a circuit diagram of transformer circuit 280 and ringer drive circuit 300.

In this embodiment, transformer circuit 280 includes a transformer 400 a power shutoff signal line 410, and power outputs 420. Transformer 400 maybe embodied as any conventional multi-tap transformer.

As discussed earlier, power shutoff signal line 410 disables power output from transformer circuit 280, until enabled by signal processor 270 and/or the AltiWare™ software. The power outputs 420 are input into the functional circuits, as described above.

Ringer drive circuit 300 includes power input from transformer circuit 280, and a ring enable signal line 430. As discussed earlier, a ring enable signal, typically generated by signal processor 270 enables generation of a ringing signal on signal line 440.

Figure 4:
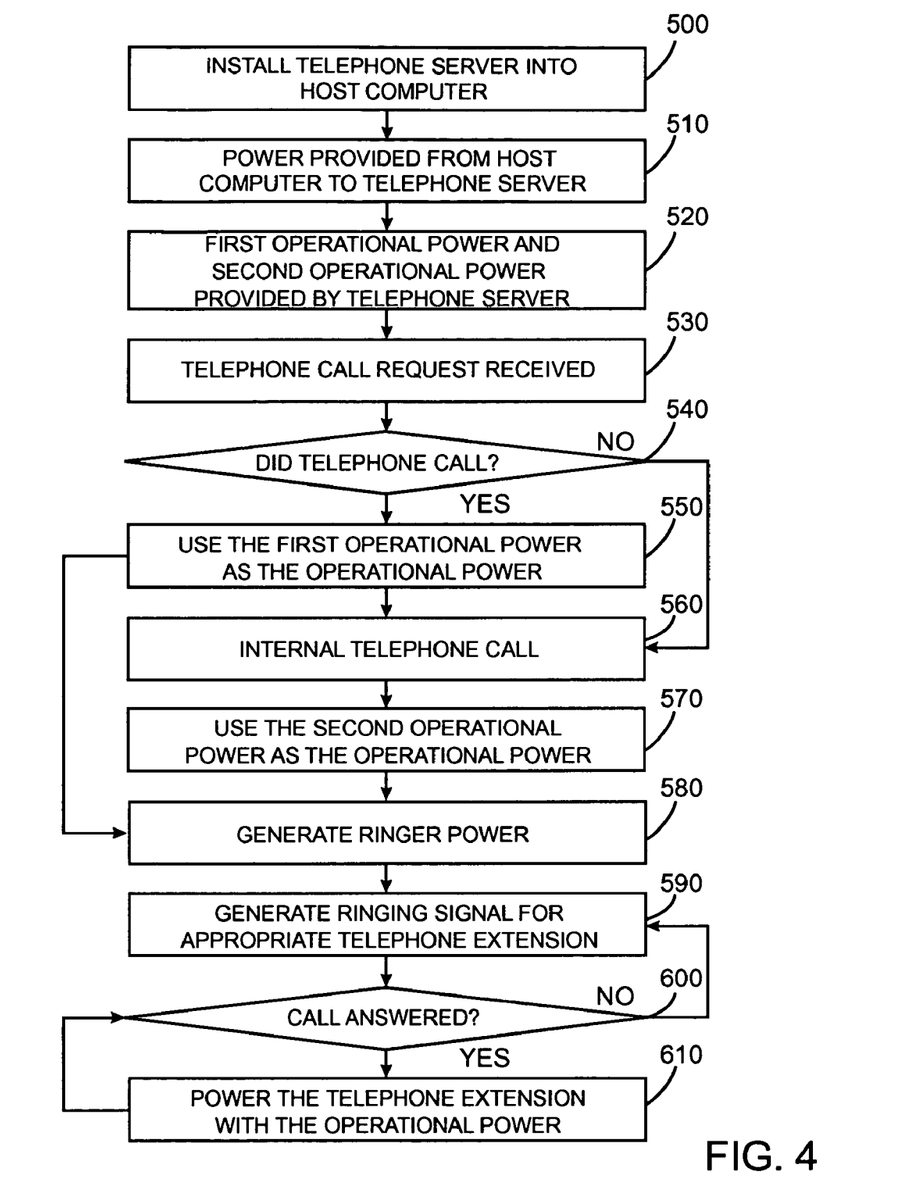
FIG. 4 illustrates a flow diagram of an embodiment of the present invention.

FIG. 4 illustrates a flow diagram of an embodiment of the present invention.

Initially telephone server 70 is installed into computer 40, step 500. Next, telephone server 70 receives power from computer 40 via computer bus 210, step 510. As discussed above, the power signals comprise a primary power signal of approximately 12 volts DC and a secondary power signal of approximately 5 volts DC. Alternatively, telephone server 70 may receive power directly from a transformer provided in computer 40. The transformer circuit 280 receives the primary power and generates a first operational power and a second operational power, step 520.

Next, signal processor receives a telephone call for a particular telephone extension line, step 530. If the telephone call is a DID telephone call from telephone trunk line 240, step 540, the first operational power is used as the operational power, step 550. The first operational power has a voltage of approximately −50 volts. DC, as noted earlier. If the telephone call is from an internal telephone line 250, step 560, the second operational power is used as the operational power, step 570. The second operational power has a voltage of approximately −25 volts DC, as noted earlier.

A ringer power is then generated, step 580. Next, in response to the ringer power, a ringing signal is generated for the particular telephone extension line, step 590. Once the particular telephone extension line is answered, step 600, the particular telephone handset connected to the particular telephone line is powered using the operational power, step 610. In particular, when the call is a DID telephone call, the telephone handset is powered with the first operational voltage, whereas when the call is an internal telephone call, the telephone handset is powered with the second operational voltage.

Typically, when telephone handsets are off-hook, they draw approximately 25 milliamps, regardless of the applied voltage. Therefore, approximately twice the amount of power is required from telephone server 70 when a DID telephone call is received as compared to an internal telephone call. By reducing the operational voltage for internal telephones, the total amount of power drawn from telephone server 70 is advantageously reduced.

In another embodiment, particular telephone lines are pre-assigned to be DID telephone lines and other lines are pre-assigned to be internal telephone extensions. In such a case, signal processor 270 provides the −48 volts automatically to those DID telephones, and provides the −24 volts automatically to those internal telephone extensions when they are used. Thus when an telephone call arrives for a particular telephone line, signal processor 270 knows which voltage to provide the telephone, based upon the pre-assigned telephone configuration.

Figure 5:
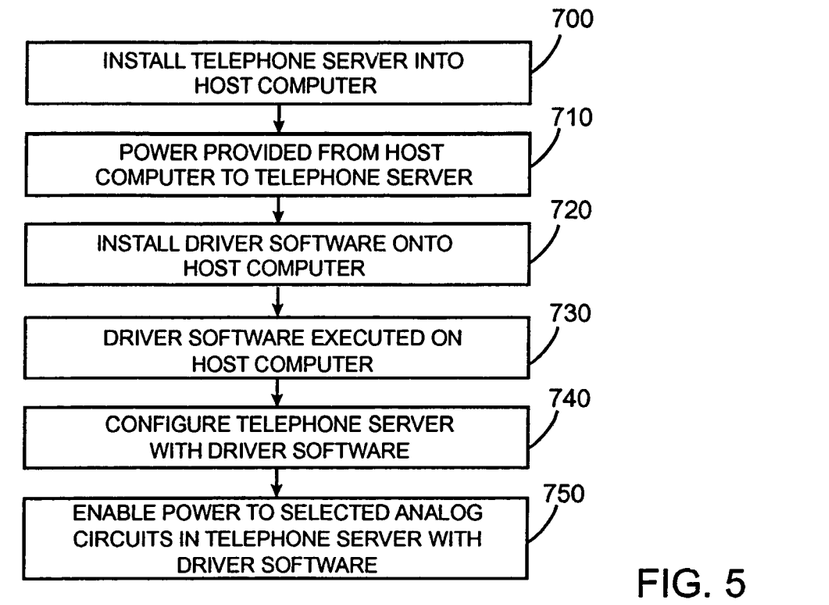
FIG. 5 illustrates a flow diagram of another embodiment of the present invention.

FIG. 5 illustrates a flow diagram of another embodiment of the present invention.

Initially telephone server 70 is installed into computer 40, step 700. Next, telephone server 70 receives power from computer 40 via computer bus 210, step 710. As discussed above, the primary power is typically about 12 volts DC and the secondary power is typically about 5 volts DC.

Telephone server software is then installed on computer 40, step 720. In the present embodiment, the telephone server software is embodied as the above mentioned AltiWare™ software. The telephone server software is then executed on computer 40, step 730. The telephone server 70 is then configured from the telephone server software, step 740.

In response to the configuration step, telephone server 70 is configured, and operational power can then be supplied to the telephone lines 250, step 750. As noted above, this step is performed in the present embodiment by having signal processor 270 either assert an enabling signal to transformer circuit 280, or de-assert a power inhibiting signal. Telephone server 70 may then operate normally.

In another embodiment, telephone server software may make use of functionality provided by computer 40. For example, computer 40 may have functionality provided on a computer motherboard that allows turning on and turning off power to particular bus slots. Thus in such a configuration, telephone server software may simply direct computer 40 to prevent power from being applied to telephone server 70 via computer bus 80, for example, until the software or hardware phone system is fully configured. After the telephone server software and/or the hardware phone system have been configured, telephone server 70 may be powered up.

Figure 6:
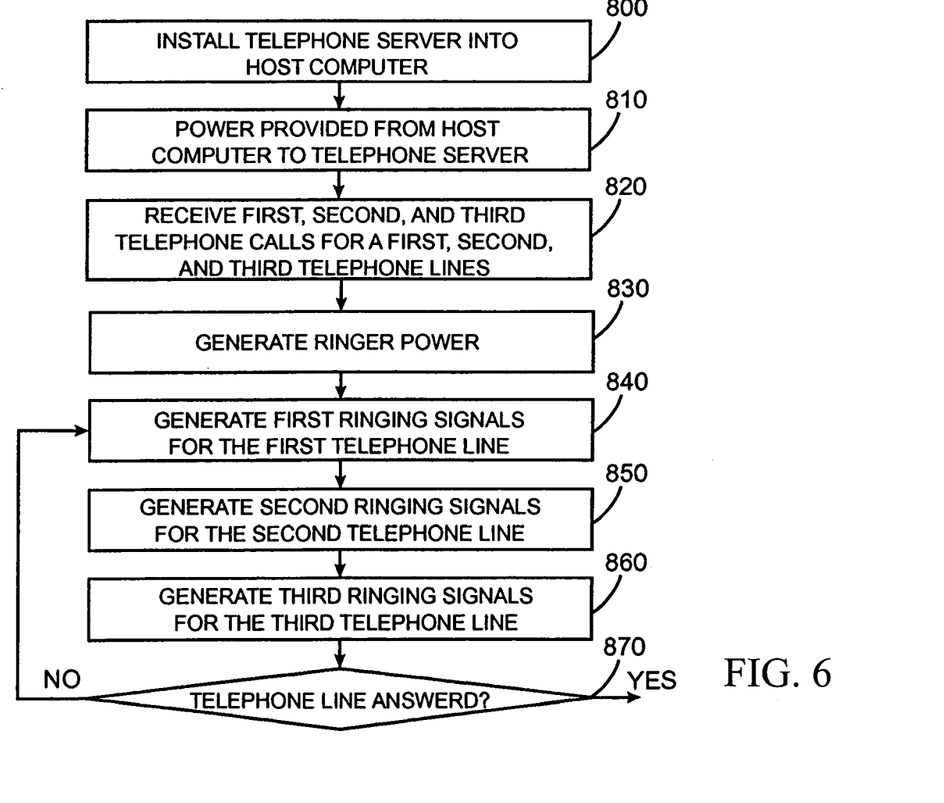
FIG. 6 illustrates a flow diagram of another embodiment of the present invention.

FIG. 6 illustrates a flow diagram of another embodiment of the present invention.

Initially telephone server 70, for example, that described above, is provided into a computer, step 800. Next, telephone server 70 receives power from computer 40 via computer bus 210, step 810. As discussed above, the power comprise a primary power supply of approximately 12 volts DC and a secondary power supply of approximately 5 volts DC.

Next, signal processor receives a first telephone call for a first telephone extension line, a second telephone call for a second telephone extension line, and a third telephone call for a third telephone extension line, step 820. A ringer power is generated, step 830.

In response to the ringer power and to a first signal from signal processor 270, a ringing signal is generated for the first telephone extension line for a period of time, step 840. Then, in response to the ringer power and to a second signal from signal processor 270, a ringing signal is generated for the second telephone extension line for the same period of time, step 850. Then, in response to the ringer power and to a third signal from signal processor 270, a ringing signal is generated for the third telephone extension line for the same period of time, step 860. The ringing cycle repeats for each telephone extension line until that extension is picked up or is forwarded to another extension, for example a voice mail extension.

By multiplexing the ringing of the telephone lines, the number of phones that actually "ring" at the same time, i.e. that are powered by ringer drive circuit 300 at the same time, is reduced. The present embodiment of telephone server 70 supports a maximum of 12 telephone handsets, and by multiplexing the ringing signals as discussed above, ringer drive circuit 300 need only supply ringing signals to one-third of them, or four telephone handsets at the same time. In alternative embodiments, ringing signals can be supplied to half of the maximum phones at the same time, and in other embodiments, ringing signals can be supplied to one fourth the maximum number of phones at the same time. Other duty cycles and phases are also contemplated for the ringing signal in alternative embodiments of the present invention.

By reducing the number of phones that actually "ring" at the same time, the power requirements of transformer circuit 280 are reduced. Merely as an example, if the amount of power drawn by a telephone handset during a ring is 1 watt and the maximum number of telephone handsets supported by the telephone server 70 is 15 phones, then simultaneously ringing all fifteen phones would draw 15 watts from ringer drive circuit 300 and transformer circuit 280. In the present embodiment, by using ringing signal that is has a duty cycle of one-third and that has three phases, then simultaneously ringing one-third the phones, or five phones, would draw only 5 watts from ringer drive circuit 300 and transformer circuit at the same time. Because the power demand on ringer drive circuit 300 and transformer circuit are reduced advantageously, telephone server 70 may be assembled using, lower powered, lower noise, and lower heat producing components for ringer drive circuit 300 and transformer circuit 280.

It should be understood that in the embodiment above, that several phones may ring during each of the ring steps 840–860. For example, if there are a maximum of sixteen phones each with an incoming telephone call, the ringing signal duty cycle is 25 percent, and the telephone ringing signals are out of phase by one quarter of a cycle, there would be four "ring" phases. During the first phase, phones 1–4 could ring, during the next phase, phones 5–8 could ring, during the next phase, phones 9–12 could ring, and during the last phase, phones 13–16 could ring. The first through fourth phases can then be repeated.

In the example above, if users on telephone lines 1–8 have answered their calls (or the calls have been transferred to a messaging system), the first and second phases will not draw power from the transformer circuit for ringing. In an alternative embodiment, when ring phases are empty or underutilized, re-distribution of ringing to such empty or underutilized ringing phases is envisioned. For example in the example above, ringer signals for telephones 9 and 10 may be transferred (phase shifted) to phase one and ringer signals for telephones 13 and 14 may be transferred to phase two. As a result, each ring phase would support ringer signals for only two telephones. The ringer drive circuit thus draws power more equally from the transformer circuit.

Figure 7:
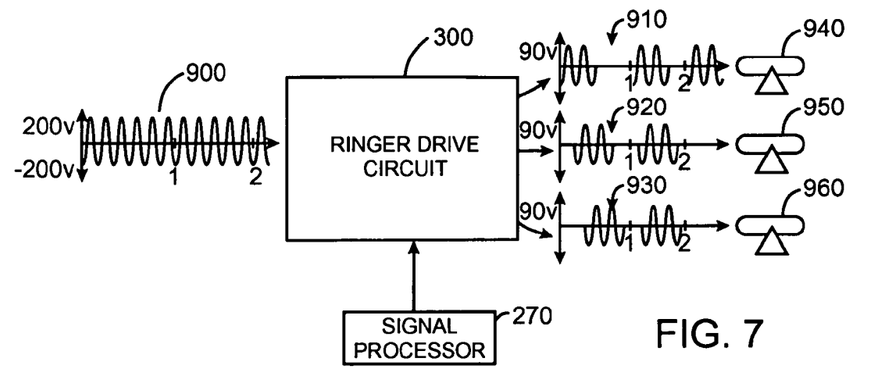
FIG. 7 illustrates an example of an embodiment of the present invention.

FIG. 7 illustrates an example of an embodiment of the present invention. FIG. 7 includes ringer power 900, and ringer signals 910, 920, and 930. The ringer signals 910, 920, and 930 are respectively applied to telephone lines 940, 950, and 960.

In FIG. 7, signal processor 270 directs telephone lines 940, 950, and 960 to ring. Contemporaneously, transformer circuit 280 generates ringer power 900. The magnitude of ringer power 900 is then reduced and time multiplexed into thirds, with the ringer signals 910–930 each having a 33 percent duty cycle. Because the ringer power 900 is multiplexed, the ringer signals 910–930 are out of phase by one-third.

As can be seen from FIG. 7, instead of having ringer power 900 be of sufficient current to ring all three telephone extensions at the same time, by ringing the telephones extensions out of phase, the power capability of ringer power can be reduced.

In the present embodiment, twelve telephone handsets can be coupled to telephone server 70 at one time. Further, the ringing duty cycle is set to approximately 33 percent. Because, the twelve telephone handsets ring out of phase in the present embodiment, the ringer drive circuit need only supports ringing of up to four telephone handsets at the same time.

In alternative embodiments, ringing power can be supplied to a greater number of phones at the same time, and in other embodiments, ringing power can be supplied to lesser number of phones at the same time. Other duty cycles and phases are also contemplated for the ringing signal in alternative embodiments of the present invention. For example, Signal processor 270 may apply a different ringing signal pattern for DID telephone calls and for internal calls (from other telephone handsets 260, auto attendant, attendant, and the like). In such a case an internal call may have a duty cycle of 50 percent whereas a DID telephone call may have a duty cycle of 33 percent. In such embodiments, ringer drive circuit 300 and transformer circuit 280 should be of sufficient power capacity to handle the power demand. In the preceding example, for internal calls, the ringing signal could be set out of phase by 50 percent, thus ringer drive circuit 300 should be able to ring at least half the maximum number of telephones at the same time.

Figure 8:
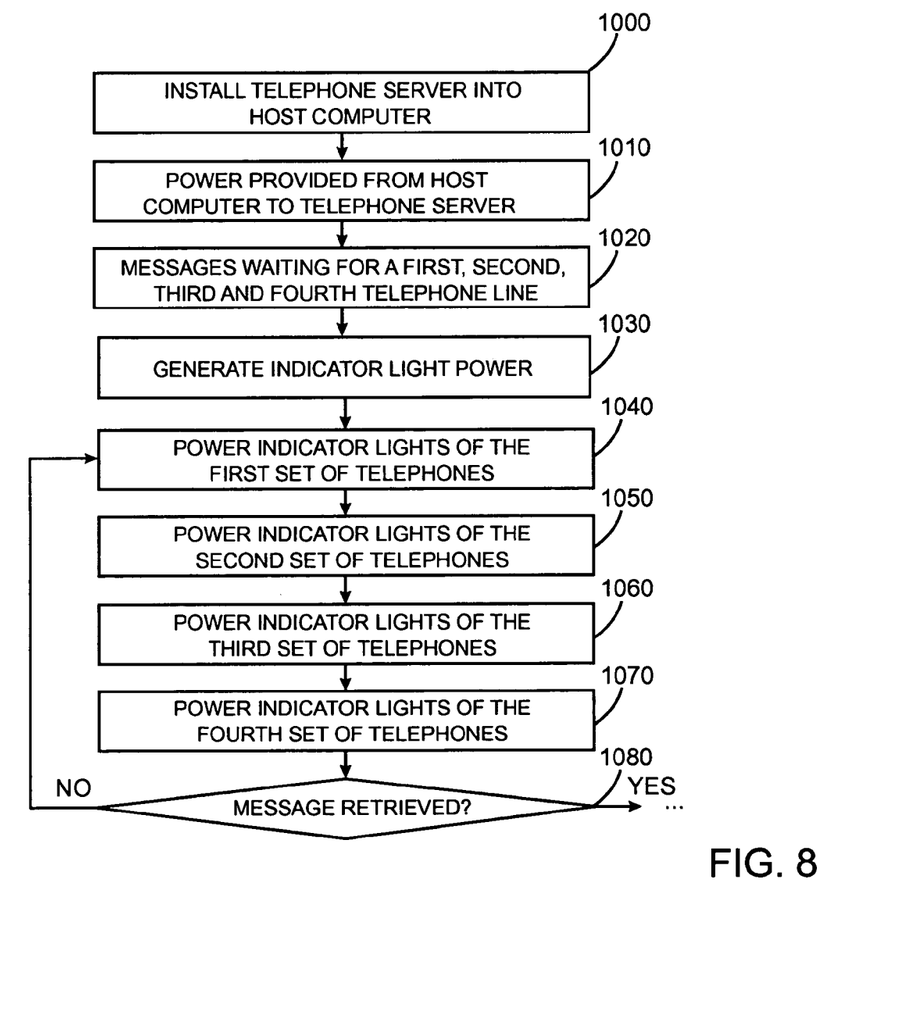
FIG. 8 illustrates a flow diagram of another embodiment of the present invention.

FIG. 8 illustrates a flow diagram of another embodiment of the present invention.

Initially telephone server 70, for example, that described above, is provided into a computer, step 1000. Next, telephone server 70 receives power from computer 40 via computer bus 210, step 1010. As discussed above, the power signals comprise a primary power supply of approximately 12 volts DC and a secondary power supply of approximately 5 volts DC. As further discussed above, the present embodiment utilizes known "voltage message waiting" techniques in order to activate indicator lights on telephone handsets.

Next, signal processor 270 determines that messages are waiting in voice mailboxes for a first, second, third, and fourth telephone lines, step 1020. Indicator light power is generated and received by indicator light circuit, step 1030. Next, an indicator light signal is generated for only the first telephone extension line for a period of time, step 1040. Then, an indicator light signal is generated for only the second telephone extension line for a period of time, step 1050. Then, an indicator light signal is generated for only the third telephone extension line for a period of time, step 1060. Then, an indicator light signal is generated for only the fourth telephone extension line for a period of time, step 1070. This cycle of applying the indicator light signal repeats for each telephone extension line until a particular extensions messages are retrieved.

By multiplexing the flashing of indicator lights of the telephone lines, the number of phones that actually "flash" at the same time, i.e. that are powered by indicator light circuit 310 at the same time, is reduced. The present embodiment of telephone server 70 supports a maximum of 12 telephone handsets, and by multiplexing the indicator light signals as discussed above, indicator light circuit 310 need only supply flashes to approximately one-fourth of the telephone handsets at the same time. In alternative embodiments, indicator light signals can be supplied to half of the maximum number phones at the same time, and in other embodiments, indicator light signals can be supplied to one sixth the maximum number of phones at the same time. Other duty cycles and phases are also contemplated for the indicator light signals in alternative embodiments of the present invention.

By reducing the number of phones that "flash" at the same time, the power requirements of transformer circuit 280 are reduced. Merely as an example, if the amount of power drawn by an indicator light during a flash is 2 watts and the maximum number of telephone handsets (with indicator lights) supported by the telephone server 70 is 16 phones, then simultaneously flashing the indicator lights of all 16 phones would draw 32 watts from transformer circuit 280. In the present embodiment, by using indicator light signals that have a duty cycle of 25 percent and that is out of phase by one-fourth a cycle, then simultaneously flashing indicator lights of one-fourth the phones, or 4 phones, would draw only 4 watts from transformer circuit 280. Because the power demand on transformer circuit 280 is reduced advantageously, telephone server 70 may be assembled using, lower powered, lower noise, lower heat producing components, and the like for transformer circuit 280.

It should be understood that in the embodiment above, that several phones may flash during each of the flash steps 1020–1070. For example, if there are a maximum of eight phones each having messages, the indicator light duty cycle is 25 percent, and the phones are out of phase by one quarter of a cycle, there would be four "flash" phases. During the first phase, telephones 1 and 2 could flash, during the next phase, telephones 3 and 4 could flash, during the next phase, telephones 5 and 6 could flash, and during the last phase, telephones 7 and 8 would flash. The first through fourth phases can then be repeated.

In the example above, if users at telephones 5 through 8 have retrieved their messages, the third and fourth phases will not draw indicator light power. In an alternative embodiment, when flash phases are empty or underutilized, re-distribution of flashes to such empty or underutilized flash phases is envisioned. For example in the example above, telephone 2 may be transferred (phase shifted) to flash phase three and telephone 4 may be transferred to flash phase four. As a result, each flash phase would flash only one telephone, thus the indicator light circuit would draw power more equally from the transformer circuit.

Figure 9:
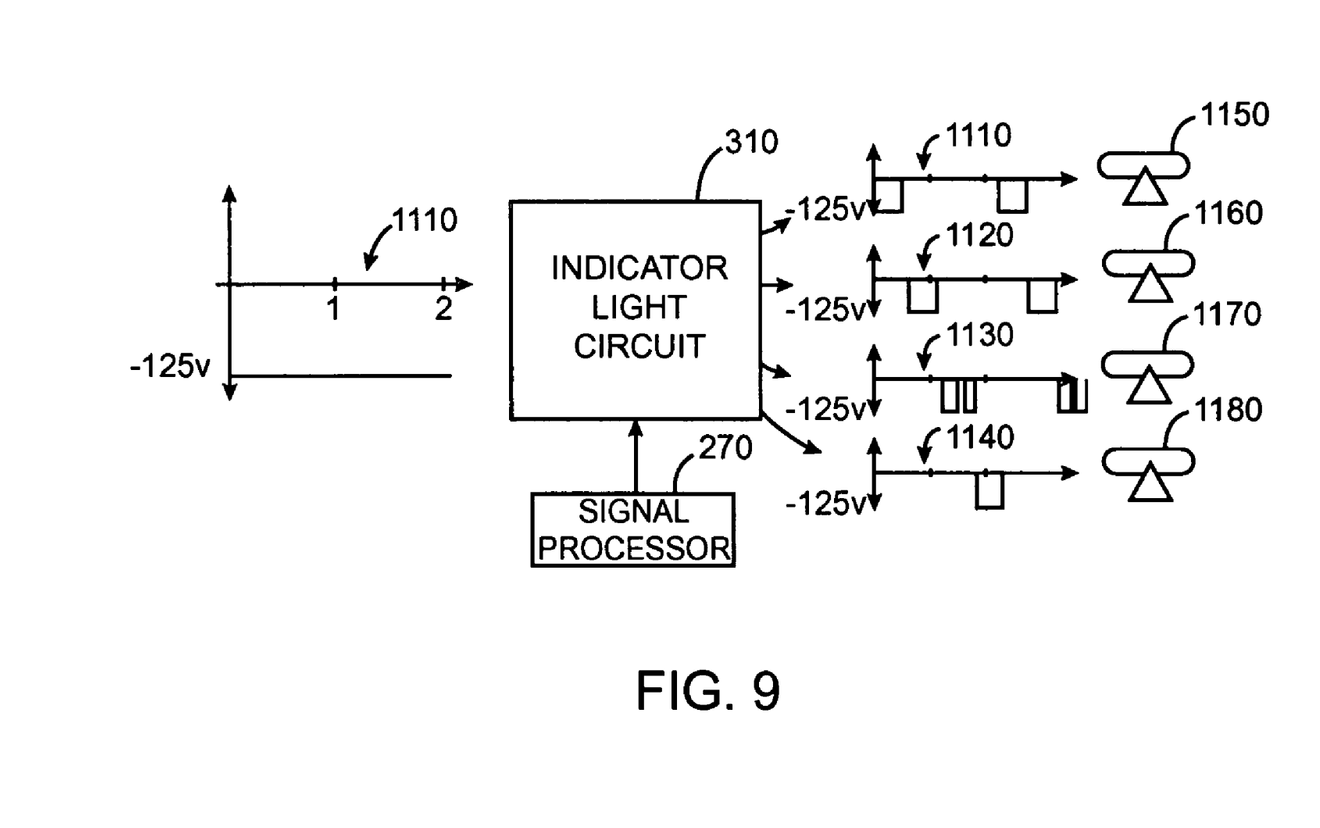
FIG. 9 illustrates an example of an embodiment of the present invention.

FIG. 9 illustrates an example of an embodiment of the present invention. FIG. 9 includes an indicator light power supply 1100, and indicator light signals 1110, 1120, 1130, and 1140. The indicator light signals 1110, 1120, 1130, and 1140 are respectively applied to telephone lines 1150, 1160, 1170, and 1180.

In FIG. 9, signal processor 270 notifies telephone lines 1150, 1160, 1170, and 1180 that messages are waiting is respective message boxes. The indicator light power from transformer circuit 280 is time multiplexed into quarters, with the indicator light signals 1110–1140 each having a 25 percent duty cycle. Because the indicator light power 1100 is multiplexed, the indicator light signals 1110–1140 are out of phase by one-fourth of a cycle.

As can be seen from FIG. 9, instead of having indicator light power supply 1100 be of sufficient current to flash all four telephone extensions at the same time, by flashing the telephones extensions out of phase, the power capability of transformer circuit 280 can reduced. In the present embodiment, twelve telephone handsets can be coupled to telephone server 70 at one time. Further, the indicator light duty cycle is set to approximately 25 percent. Because, the twelve telephone handsets flash out of phase in the present embodiment, the transformer circuit need only supports flashing for three telephone handsets at the same time.

In alternative embodiments, indicator light signals can be supplied to a greater number of phones at the same time, and in other embodiments, indicator light signals can be supplied to lesser number of phones at the same time. Other duty cycles and phases are also contemplated for the indicator light signal in alternative embodiments of the present invention. For example, the indicator lights may have a flash duty cycle of 50% and two cycles or phases for flashing. In another example, Signal processor 270 may apply different flashing signal patterns for the number of messages waiting in the message inbox, as shown, based upon the priority of the messages, or the like. In such a case the indicator light signal may have a different duty cycle or different flash pattern.

Although used in the context of messaging, and voice mail messaging, the indicator light signal may be used for other purposes, for example to indicate that the telephone is in a "do not disturb" mode, is in a "transfer mode", and the like.

CONCLUSION

In the foregoing specification, the invention has been described with reference to specific exemplary embodiments thereof. Many changes or modifications are readily envisioned. For example, power to each telephone may individually be controlled by signal processor 270, or power to particular groups of telephone may be controlled by signal processor. As another example, other methods for indicating whether there are messages waiting, and the like, include for example, a stuttered dial tone, frequency shift key (FSK), and the like.

In other embodiments, combinations or sub-combinations of the above disclosed invention can be advantageously made. For example, in one telephone server, the transformer circuit is enabled by the signal processor, however only one operating voltage, not two are provided, and the like.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing power within a telephone server coupled to a computer system via an interface bus, to a maximum number of telephones, and to a telephone trunk, the computer system providing a primary voltage and a secondary voltage, the method including:

receiving the primary voltage and the secondary voltage from the computer system;

generating ringer power in response to the primary voltage;

generating direct inward dialing power in response to the primary voltage, the direct inward dialing power configured to provide a first operational voltage for a plurality of telephones from the maximum number of telephones, when the plurality of telephones receive telephone calls directly from the telephone trunk; and generating a ringing signal in response to the ringer power and to the secondary voltage;

generating second operational voltage in response to the primary voltage for the telephones from the maximum number of telephones, when the telephones receive telephone calls from other telephones from the maximum number of telephones;

wherein the first operational voltage is greater than the second operational voltage;

wherein a peak voltage of the ringing signal is provided to no more than approximately one half of the maximum number of telephones at a time, and wherein none of the plurality of telephones are on a common line.

2. The method of claim 1 further comprising:

generating an indicator light signal in response to the primary voltage, wherein a peak voltage of the indicator light signal is provided to no more than approximately a half of the maximum number of telephones at a time.

3. The method of claim 2 further comprising:

generating indicator light voltage in response to the primary voltage;

wherein a peak voltage of the indicator light voltage is provided to no more than approximately a quarter of the maximum number of telephones at a time.

4. The method of claim 1 wherein the ringing signal has a duty cycle selected from the group consisting of: approximately 33 percent, approximately 25 percent, approximately one half.

5. The method of claim 4 wherein a peak voltage of the ringing signal is provided to no more than a portion of the maximum number of telephones at a time, wherein the portion is selected from the group consisting of: approximately one third, approximately one half, approximately one third.

6. The method of claim 1 wherein the first operational voltage is approximately twice the second operational voltage.

7. A telephone server coupled to a computer system via a computer bus, configured to provide output power and signals to a plurality of telephones, and to a telephone the computer system providing a primary voltage and a secondary voltage, the telephone server comprising:

a transformer circuit configured to receive the primary voltage and to provide first operational power in response to the primary voltage signal the first operational power configured to power a plurality of telephones that receive telephone calls from the telephone trunk; and ringer circuitry coupled to the transformer circuit configured to receive the ringer power, to receive the second voltage, and to provide a ringing signal in response thereto;

wherein the transformer circuit is also configured to provide second operational power in response to the primary voltage, wherein the second operational power provides power to telephones that receive telephone calls from other telephones of the plurality of telephones; and wherein the first operational power is greater than the second operational power;

wherein the ringer circuitry is configured to provide a peak voltage of the ringer power to no more than approximately one half a maximum number of telephones that may be coupled to the telephone server at a time, and wherein none of the plurality of telephones are on a common line.

8. The telephone server of claim 7 wherein the transformer circuit is also configured to provide an indicator light power in response to the primary voltage, and wherein indicator light circuitry is configured to provide a peak voltage of the indicator light power to no more than approximately a fraction of the maximum number of telephones, wherein the fraction is selected from the group consisting of: one quart, one half, one third.

9. The telephone server of claim 8 wherein the indicator light circuitry is configured to provide an indicator light signal in response to the indicator light power, wherein the indicator light signal is configured to have a duty cycle of less than a percentage, wherein the percentage is selected from the group consisting of: approximately 25 percent, approximately 33 percent.

10. The telephone server of claim 7 wherein the first operational power is approximately twice the second operational power.

11. The telephone server of claim 7 further comprising:

wherein the transformer circuit is also configured to receive an enabling signal from the computer system; and wherein the transformer circuit is also configured to provide the first operational power in response to the enabling signal.

12. The telephone server of claim 7 wherein the first operational power is applied to a telephone when the telephone receives a DID telephone call; and wherein the second operational power is applied to the telephone when the telephone receives an internal telephone call.

13. A method for a telecommunications interface for providing drive voltages for a plurality of telephones coupled thereto, the telecommunications interface also coupled to a computer system, the computer system providing a first drive voltage and a second drive voltage to the telecommunications interface, the method including:

receiving an enabling signal for the telecommunications interface from the computer system;

generating a ringing drive voltage within the telecommunications interface in response to the first drive voltage and to the enabling signal, wherein a ringer circuit is configured to provide the ringing drive voltage to a subset of a maximum number of telephones that may be coupled to the telecommunications interface at one time, and wherein none of the telephones are coupled to a common line; and generating a first operational drive voltage for a telephone from the plurality of telephones within the telecommunications interface when a call directed to the telephone is a directly dialed call from the telephone trunk wherein the first operational drive voltage for the telephone is generated in response to the enabling signal.

14. The method of claim 13 further comprising;

providing the first operational drive voltage to the telephone when the call is a directly dialed call.

15. The method of claim 13 further wherein the first operational power is greater than the second operational power.

16. The method of claim 15 wherein a peak voltage of the indicator light drive voltage is provided to no more than a proportion of the maximum number of telephones at a time, wherein the proportion is selected from the group consisting of: approximately one-half, approximately one quarter.

17. The method of claim 13 wherein a pea voltage of the ringing drive voltage is provided to no more than a proportion of the maximum number of telephones at a time, wherein the proportion is selected from the class consisting of: approximately one half, approximately one-third.

18. The method of claim 17 wherein a ring signal derived from the ringing drive voltage has a duty cycle of less than approximately 33 percent.

19. The method of claim 13 further comprising:

generating a second operational drive voltage for the telephone within the telecommunications interface when the call directed to the telephone is an internally dialed call from another telephone of the plurality of telephones; and providing the second operational drive voltage to the telephone when the call is an internally dialed call;

wherein the first operational drive voltage has a magnitude approximately twice a magnitude of the second operational drive voltage.

* * * * *